Dec. 16, 1947.  J. ZUPONCIC  2,432,604
CHUCK
Filed July 28, 1944

INVENTOR
JOHN ZUPONCIC
BY Charles S. Evans
his ATTORNEY

Patented Dec. 16, 1947

2,432,604

UNITED STATES PATENT OFFICE 2,432,604

CHUCK

John Zuponcic, Los Angeles, Calif., assignor to Ted Nelson, San Leandro, Calif.

Application July 28, 1944, Serial No. 546,978

1 Claim. (Cl. 279—41)

The invention relates to chucks, and especially to stud welding machine chucks for holding studs having large heads such as shown and described in my assignee's copending application Serial No. 479,459, now Patent No. 2,378,720, granted June 19, 1945.

The principal object of the invention is the provision of a chuck embodying means for spreading the chuck jaws to release the piece held therein. Other secondary objects include the provision of a chuck jaw spreading means of marked simplicity, which operates by a mere closing of the hand upon the chuck, and which is readily assembled thereon.

My invention possesses other objects and features of value which with the foregoing will be explained in the following description. It is to be understood that I do not limit myself to the showing made by the said description and the drawings as I may adopt variant forms of the invention within the scope of the appended claim.

Figure 1:
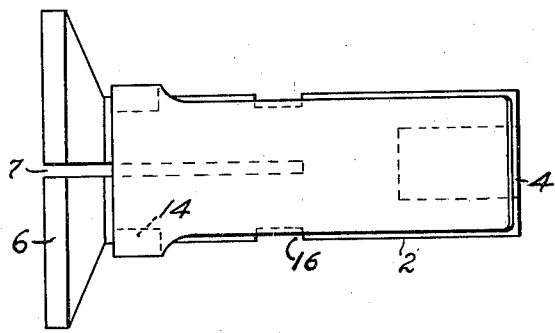
Figure 2:
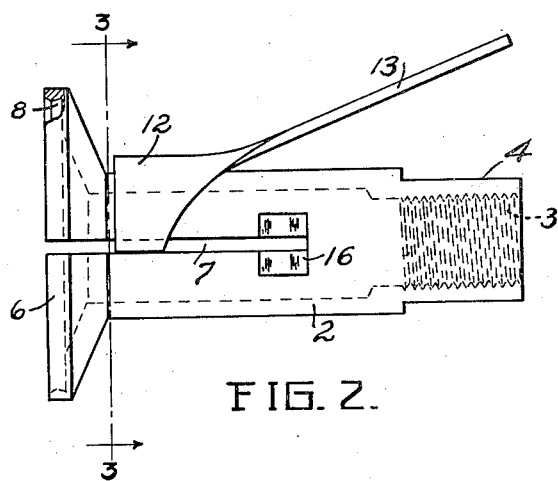
Figure 3:
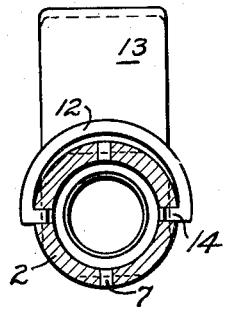

Referring to the drawings: Figure 1 is a top or plan view of a chuck embodying my invention; and Figure 2 is a side elevation thereof. Figure 3 is a vertical sectional view of the chuck, the plane of section being indicated by the line 3—3 of Figure 2.

In certain types of construction, it has become common practice to hold sheets of thermal insulation against steel walls or backing plates by means of large flat headed studs welded to the wall, and with the large flat head seated snugly in or against the surface of the insulating sheet.

In order to hold the stud by its head while it is being pushed through the insulating sheet and welded to the wall, a chuck is used. The chuck has spring arms providing a socket into which the stud head can be snapped and resiliently held. After the weld is completed the welding machine must be disengaged from the stud head.

In order to avoid lateral bending of the stud body or displacement of the head out of a plane perpendicular to the stud body by twisting or wrenching the chuck free of the stud, I provide a lever lying alongside of the chuck body, and so interposed between opposite jaws, as to spread them enough to release the stud head when the chuck body and lever are grasped by the hand of the welder. Both chuck proper and lever are single pieces, and to assemble them into operative relation, and so retain them, without screws and other parts, the two pieces are proportioned and fitted to permit small temporary resilient displacement of interlocking parts.

In terms of greater detail, the chuck of my invention comprises a hollow body 2, havng threads 3 at one end to facilitate its mounting on the spindle of a stud welding machine. Flats 4 are formed to provide wrench holds. The other end of the chuck is flared out into a flange and separated into preferably four resilient jaws 6 by the slots 7.

The faces of the jaws are formed with a recess 8, which is slightly undercut as best shown in Figure 2 so that the large flat head of the stud may be pushed into the recess and there resiliently held, it being understood that the chuck is made to hold but a single size of head.

Overlying two adjacent body portions of the jaws is the yoke end 12 of the releasing lever 13. This lever is one integral piece preferably shaped from flat stock in suitable dies. On the lower edge of each side of the yoke is formed a flange 14, which extends well into the slot 7 on that side. The distance between the inner edges of the flanges is somewhat less than the distance separating the flat bottom faces of the two grooves 16, formed on opposite sides of the chuck body at the inner ends of the slots 7. The width of the grooves is slightly greater than the length of the flanges 14. With this construction, the releasing lever is assembled on the chuck by positioning the yoke over the neck formed by the grooves 16, and pressing the two parts together whereupon the yoke will yield resiliently while the flanges 14 slide through the grooves and snap into the slots. The lever is then moved forward into the preferred operating position, as shown in Figure 2.

It will be observed that with the yoke flanges 14 lying in opposite slots 7, squeezing the lever 13 toward the body of the chuck will tip the flanges transversely of the slots, and force a separation of the opposite pairs of jaws, thus releasing the stud head held therein. It will also be noted that because of the considerable disparity in the length of the lever arms involved, only light pressure of the fingers on the releasing lever is needed to overcome the necessarily stiff resistance of the chuck jaws.

I claim:

A chuck comprising a hollow cylindrical body having slots oppositely arranged therein to divide the body into a plurality of resilient jaws, and a resilient yoke disposed about the body and having oppositely arranged flanges extending into the slots, said yoke being extended on one side to provide a lever whereby the yoke may be moved to tip the flanges transversely of the slots in which they lie, said body having a groove extending across each slot in which a flange lies to provide a neck wider than the distance between the flanges but over which the flanged yoke may be sprung to lock the flanges within the slots.

JOHN ZUPONCIC.

REFERENCES CITED

The following references are of record in the file of this patent:

UNITED STATES PATENTS

| Number | Name | Date |
|---|---|---|
| 2,069,775 | Rich | Feb. 9, 1937 |
| 1,725,492 | Tessky | Aug. 20, 1939 |